United States Patent
Spielberg et al.

(10) Patent No.: US 8,429,189 B1
(45) Date of Patent: Apr. 23, 2013

(54) COMPUTER METHOD FOR IN-MEMORY (CO-PA) CLIENTS AND CORRESPONDING COMPUTER SYSTEM

(75) Inventors: Lars Spielberg, St. Leon-Rot (DE); Alex Gruener, Walldorf (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/329,064

(22) Filed: Dec. 16, 2011

(51) Int. Cl.
*G06F 17/30* (2006.01)
(52) U.S. Cl.
USPC .......................................... 707/770; 709/230
(58) Field of Classification Search ........... 707/770.707; 709/230
See application file for complete search history.

(56) References Cited

U.S. PATENT DOCUMENTS

| | | | |
|---|---|---|---|
| 7,685,304 B2 * | 3/2010 | Kothari et al. .............. | 709/230 |
| 7,958,105 B2 * | 6/2011 | Leff et al. ..................... | 707/706 |
| 2009/0063437 A1 * | 3/2009 | Hendrey et al. .................. | 707/4 |

* cited by examiner

*Primary Examiner* — Debbie Le
(74) *Attorney, Agent, or Firm* — Fountainhead Law Group PC

(57) ABSTRACT

A method includes generating at a client, operating on a user computer, a URL request having URL parameters according to a representational state transfer (REST) protocol, transmitting the URL request from the client to a gateway, which is operating on a server computer, and extracting via the gateway the URL parameters according to the REST protocol. The method further includes generating via the gateway a query for hosted content identified by the URL parameters, transmitting the query to the database, generating a search report for the query, and transmitting the search report from the database to the gateway. The method further includes encoding via the gateway the search report in an XML representation according to the REST protocol, and transmitting the search report in the XML representation from the gateway to the client where the client decodes the search report in the XML representation via the REST protocol for display.

17 Claims, 4 Drawing Sheets

COMPUTER METHOD FOR IN-MEMORY (CO-PA) CLIENTS AND CORRESPONDING COMPUTER SYSTEM

BACKGROUND

The present invention generally relates to computing, and more particularly relates to a computer system and a computer method for serving hosted content to a user computer using a low level transmission protocol, which is platform independent.

Unless otherwise indicated herein, the approaches described in the background section are not prior art to the claims in this application and are not admitted to be prior art by inclusion in the background section.

Computer systems are increasingly being configured for hosted applications and hosted content. A hosted application is typically a computer application operating on a set of server computers where a user computer operating a client application (i.e., "client") is configured to access the hosted application via a network, such as an intranet, the Internet, or the like. The user computer is configured to access the hosted application for use of the hosted application. The hosted application might operate on hosted content that is stored in a database accessible by a server computer, which is operating the hosted application.

Hosted content, such as business content, tends to be relatively large and access to the hosted content via a hosted application tends to be relatively slow. A user using her user computer to request hosted content may desire that the hosted content be delivered relatively quickly, such as within a few seconds. However, receiving hosted content, such as relatively large business content, from a server in such a relatively short time is often not possible.

Thus, there is a need for improved computer systems that are configured to serve hosted content relatively quickly. Embodiments of the present invention are directed at computer system configured to serve hosted content to a variety of user computers, including tablet computers and other mobile devices, relatively quickly.

SUMMARY

The present invention generally relates to computing, and more particularly relates to a computer system and a computer method for serving hosted content to a user computer using a low level transmission protocol, which is platform independent.

In one embodiment the present invention includes a computer-implemented method operable on a computer system for hosted-content retrieval. The computer-implemented method includes receiving at a client, which is operating on a user computer, a user request for hosted content stored in a database, and generating at the client a URL request having URL parameters according to a representational state transfer (REST) protocol. The computer-implemented method further includes transmitting the URL request from the client to a gateway, which is operating on a server computer, and extracting via the gateway the URL parameters from the URL request according to the REST protocol. The computer-implemented method further includes generating via the gateway a database query for hosted content identified by the URL parameters, and transmitting via the gateway the database query to the database. The computer-implemented method further includes generating in the database via an in-memory database engine a search report for the database query, and transmitting the search report from the database to the gateway. The computer-implemented method further includes encoding via the gateway the search report in an XML representation according to the REST protocol, transmitting the search report in the XML representation from the gateway to the client; and decoding via the client the search report in the XML representation via the REST protocol for use by the client.

According to one specific embodiment, the computer-implemented method further includes presenting a graphical representation of the search report on the user computer subsequent to the decoding step.

According to another specific embodiment, the search report generated by the in-memory database engine is an SQL report.

According to another specific embodiment, the search report is generated based on an analytical view of the database and the hosed data stored in the database.

According to another specific embodiment, the database request is an SQL request.

According to another specific embodiment, the transmitting steps are executed via a network.

According to another embodiment of the present invention a non-transitory computer readable medium is configured to store computer code to control a computer system for hosted-content retrieval according to the method steps described immediately above.

According to another embodiment of the present invention a computer system for hosted-content retrieval includes a user computer operating a client configured to: receive a user request for hosted content stored in a database, generate URL request having URL parameters according to a representational state transfer (REST) protocol, and transmit the URL request from the client to a gateway operating on a server computer. The computer system further includes a server computer operating the gateway configured to: extract the URL parameters from the URL request according to the REST protocol, generate a database query for hosted content identified by the URL parameters, and transmit the database query to a database. The computer system further includes a database operating an in-memory database engine configured to generate a search report for the database query; and transmit the search report from the database to the gateway. The server computer operating the gateway is further configured to encode the search report in an XML representation according to the REST protocol, and transmit the search report in the XML representation from the gateway to the client. The user computer operating the client is further configured to decode the search report in the XML representation via the REST protocol for use by the client.

According to a specific embodiment of the present invention the computer system operating the client is configured to present a graphical representation of the search report on the user computer subsequent to the decoding step.

The following detailed description and accompanying drawings provide a better understanding of the nature and advantages of the present invention.

DETAILED DESCRIPTION

Described herein are a computer method for computer systems for serving hosted content to a user computer using a low level transmission protocol, which is platform independent.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
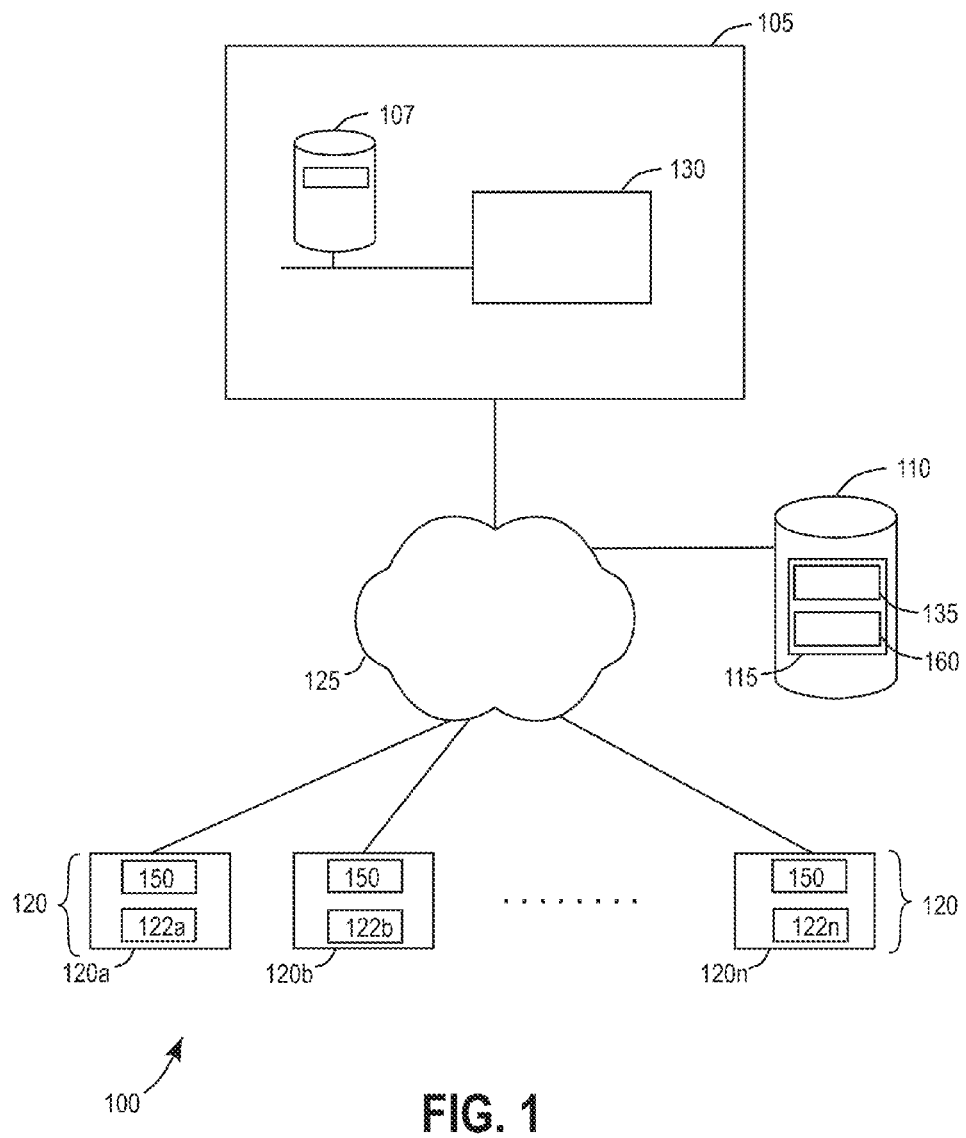
FIG. 1 is a simplified schematic of a computer system according to one embodiment of the present invention.

FIG. 1 is a simplified schematic of a computer system 100 according to one embodiment of the present invention. Computer system 100 includes a server computer 105, a computer storage 110 configured store a database 115, a set of user computers 120, and a computer network 125 communicatively linking server computer 105 and the set of user computers 120. Each user computer is labeled with the base reference numeral 120 and an alphabetic suffix. A set as referred to herein may include one or more elements. Computer network 125 may also link server computer 105 to computer storage 110. Computer network 125 may include one or more intranets, the Internet, or the like.

Server computer 105 may be configured to operate a server operating system and may include a non-transitory memory 107. Non-transitory memory 107 may be configured to store computer code that may be executable by the server computer or by a set of server computers. Each user computer may include a non-transitory memory 122 (labeled 122a, 122b . . . 122n in FIG. 1) on which computer code may be stored. The computer code may be executable by the user computers. A non-transitory memory may include semiconductor memory, optical memory, magnetic memory, or the like. The computer code stored on non-transitory memories 107 and 122 may encode the computer methods described herein and during operation may carry out the steps of the computer method embodiments described herein.

A user computer may be a desktop computer, a laptop computer, a tablet computer, a mobile device, or the like. A tablet computer may be an iPad™ type device or the like. A mobile device may be a smartphone, a personal digital assistant (PDA), or the like. It is noted that tablet computers are sometimes included in a category of user computers, which includes mobile devices.

According to one embodiment, server computer 105 is a business-objects server. According to a further embodiment, server computer 105 is an advanced business application programming (ABAP) application server, which is a specific type of business objects server. ABAP is a high-level programming language created by SAP AG of Germany, and is a language that may be used for programming the server computer for building applications that provide services, such as building business applications. According to a further embodiment, a gateway 130 is configured to operate on server computer 105. Gateway 130 is described in further detail below.

Computer storage 110 is configured store a database 115 of hosted content 135. Hosted content 135 may be business data and may specifically be CO-PA (controlling-profitability analysis) data. The CO-PA data may be configured to provide a profitability accounting and the like for users of the user computers. More specifically CO-PA data is a form of business data of SAP AG, which provides for the evaluation of market segments, which can be classified according to products, customers, orders or any combination of these. CO-PA data may also be organized and classified for strategic business units, such as sales organizations or business areas, with respect to a company's profits or contribution margins.

Figure 2:
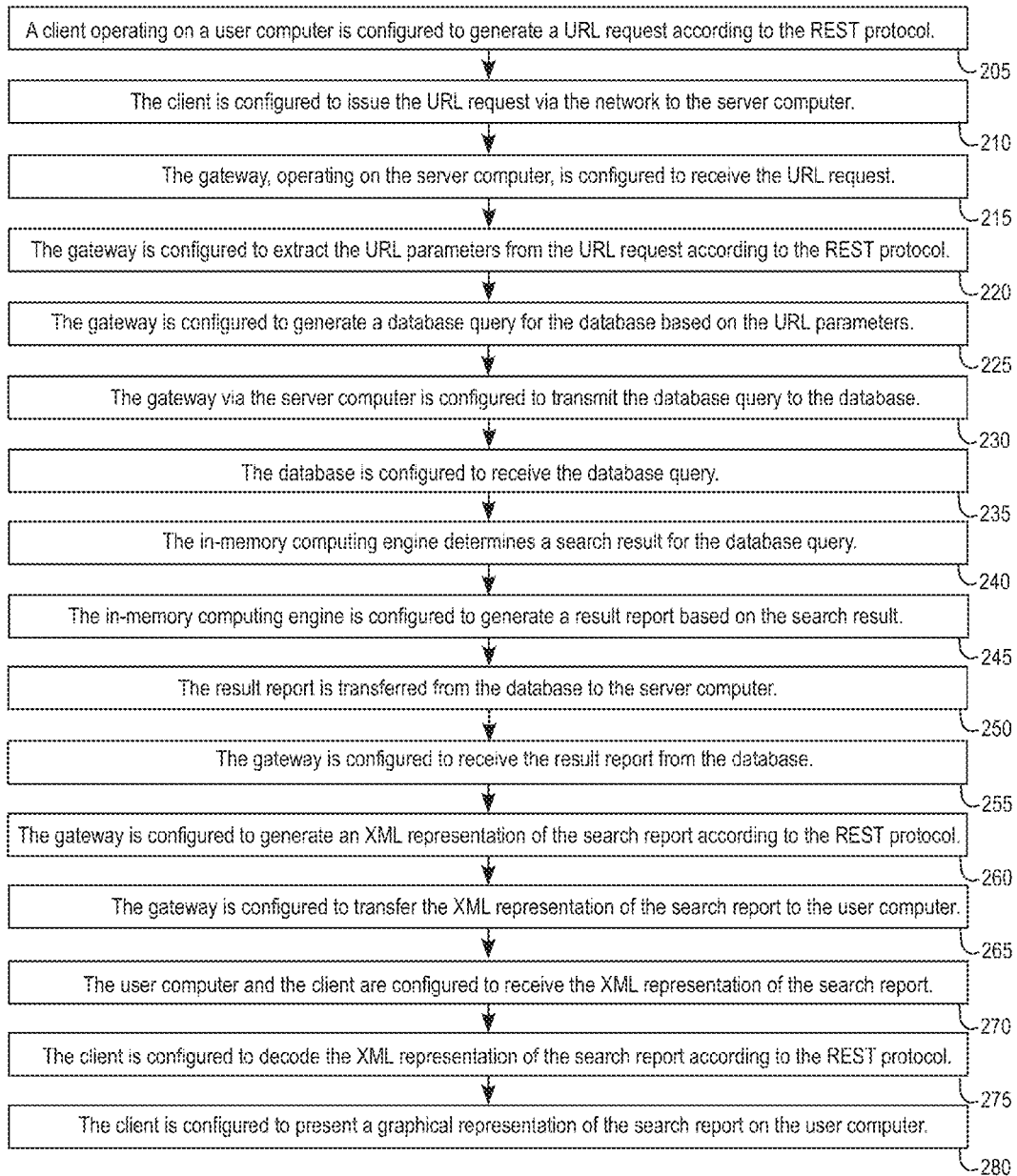
FIG. 2 is a high-level flow diagram that includes steps for a computer method according to one embodiment of the present invention.

FIG. 2 is a high-level flow diagram that includes steps for a computer method 200 according to one embodiment of the present invention. The high-level flow diagram is exemplary and steps may be added and/or combined without deviating from the scope and purview of the presently descried embodiment as will be understood by those of skill in the art. According to one embodiment, a client 150 operating on one of the user computers (e.g., user computer 120a) is configured to generate a URL (uniform resource locator) request (step 205) for hosted content, which is stored on computer storage 110. Client 150 may be a browser program, a dedicated program, or the like, configured to operate on the user computers. The client may be a plug-in configured to operate cooperatively with a browser program. According to one embodiment, client 150 may be downloaded from server computer 105 or the like via a browser program operating on a user computer. The URL request may be generated by client 150 operating on the user computer in response to an input received from a user, for example, via a graphical user interface (GUI) of the client. Prior to a user using the client for generating a URL request, the client may be required to login to a user account held with a service provided by server computer 105 as will be well understood by those of skill in the art.

The URL request may be generated by the client with URL parameters generated according to the representational state transfer (REST) protocol. The URL parameters identify the hosted content requested by the client. The REST protocol specifies a "style" of software architecture for distributed hypermedia systems such as the Internet. The REST protocol and the REST style of software architecture are substantially client independent, which provide that the URL request may be generated by a variety of clients operating on a variety of user computers, such as the types of user computers described above, including tablet computers and mobile devices. The REST protocol and the REST style of software architecture is well understood by those of skill in the art and will not be described in detail herein.

At a step 210, client 150 operating on one of the user computers is configured to issue the URL request via network 125 to server computer 105. At a step 215, server computer 105, and more specifically gateway 130, is configured to receive the URL request via computer network 125.

At a step 220, gateway 130 is configured to extract the URL parameters from the URL request according to the REST protocol, which was used by the client to generate the URL request. At a step 225, the gateway is configured to generate a database query for the database based on the URL parameters. The database query is configured to request the hosted content identified by the URL parameters. The database query may be an SQL (structured query language) query generated via an "analytic view" of the database and the hosted content. An analytic view of a database defines an overall structure of the hosted content stored in the database. SQL queries are well understood by those of skill in the art and will not be described in detail herein.

At a step 230, the gateway via the server computer is configured to transmit the database query to the database via the computer network, and at a step 235 the database is configured to receive the database query.

According to one embodiment, the database includes an in-memory computing engine 160, which is configured to identify a search result for a database query and based on the search result generate a result report. At a step 240, the in-memory computing engine determines a search result for the database query based on the analytic view of the database and the hosted content. At a step 245, the in-memory computing engine is configured to generate a result report, such as an SQL result, based on the search result for the database query generated at step 250. SQL results for database queries are well understood by those of skill in the art and will not be described herein. At a step 250, the result report (e.g., an SQL result) is transferred from the database to the server computer. At a step 255 the server computer, and more specifically gateway 130, is configured to receive the result report from the database.

At a step 260, the gateway is configured to generate an XML (extensible markup language) representation of the search report according to the REST protocol. At a step 265, the gateway via the server computer is configured to transfer the XML representation of the search report to the user computer via the computer network. At a step 270, the user computer, and more specifically the client, is configured to receive the XML representation of the search report. At a step 275, the client is configured to decode the XML representation of the search report according to the REST protocol and at a step 280 present a graphical representation of the search report on the user computer.

Figure 3A:
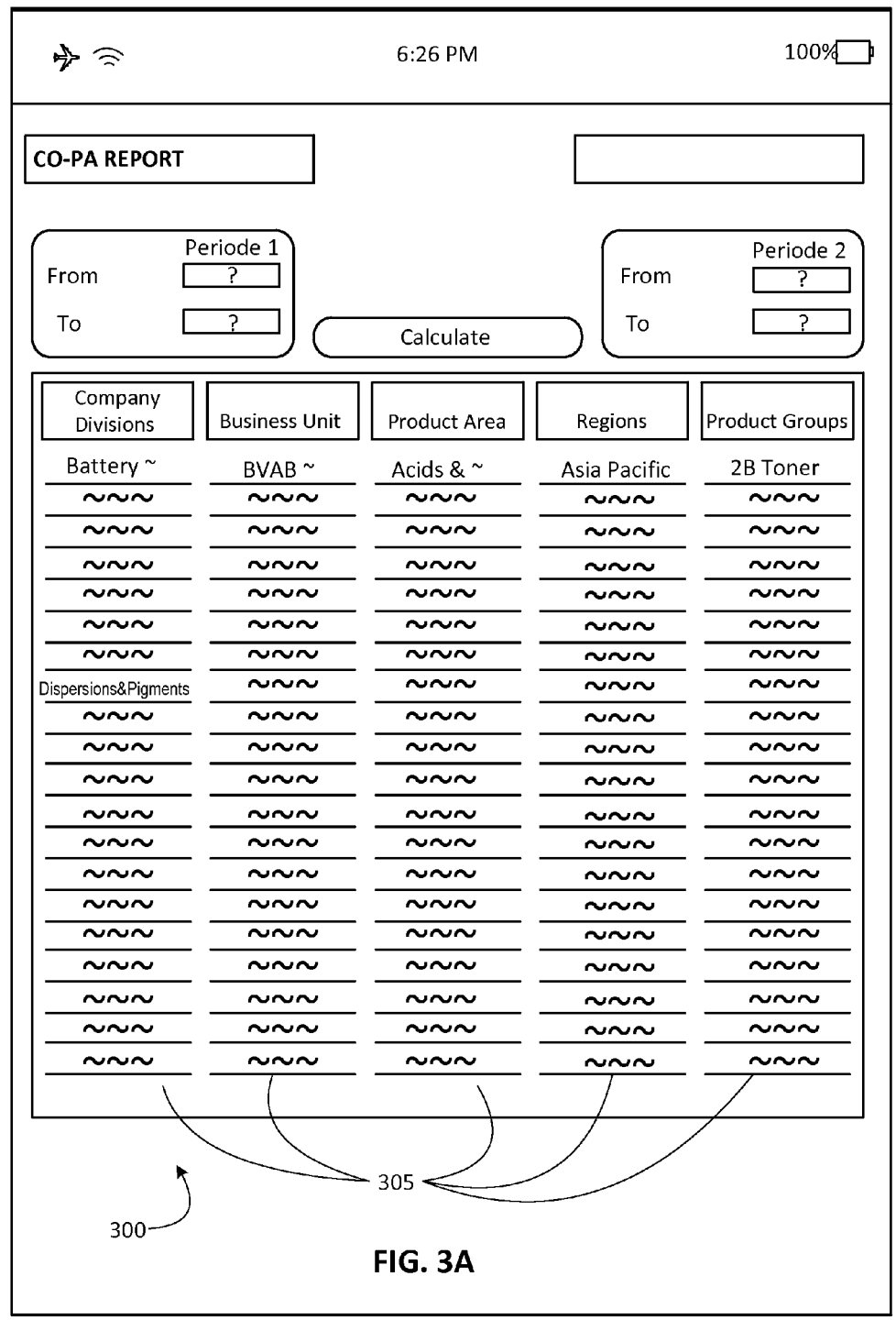
FIG. 3A is a schematic of an example graphical user interface for the client operating on a user computer according to one embodiment of the present invention.
Figure 3B:
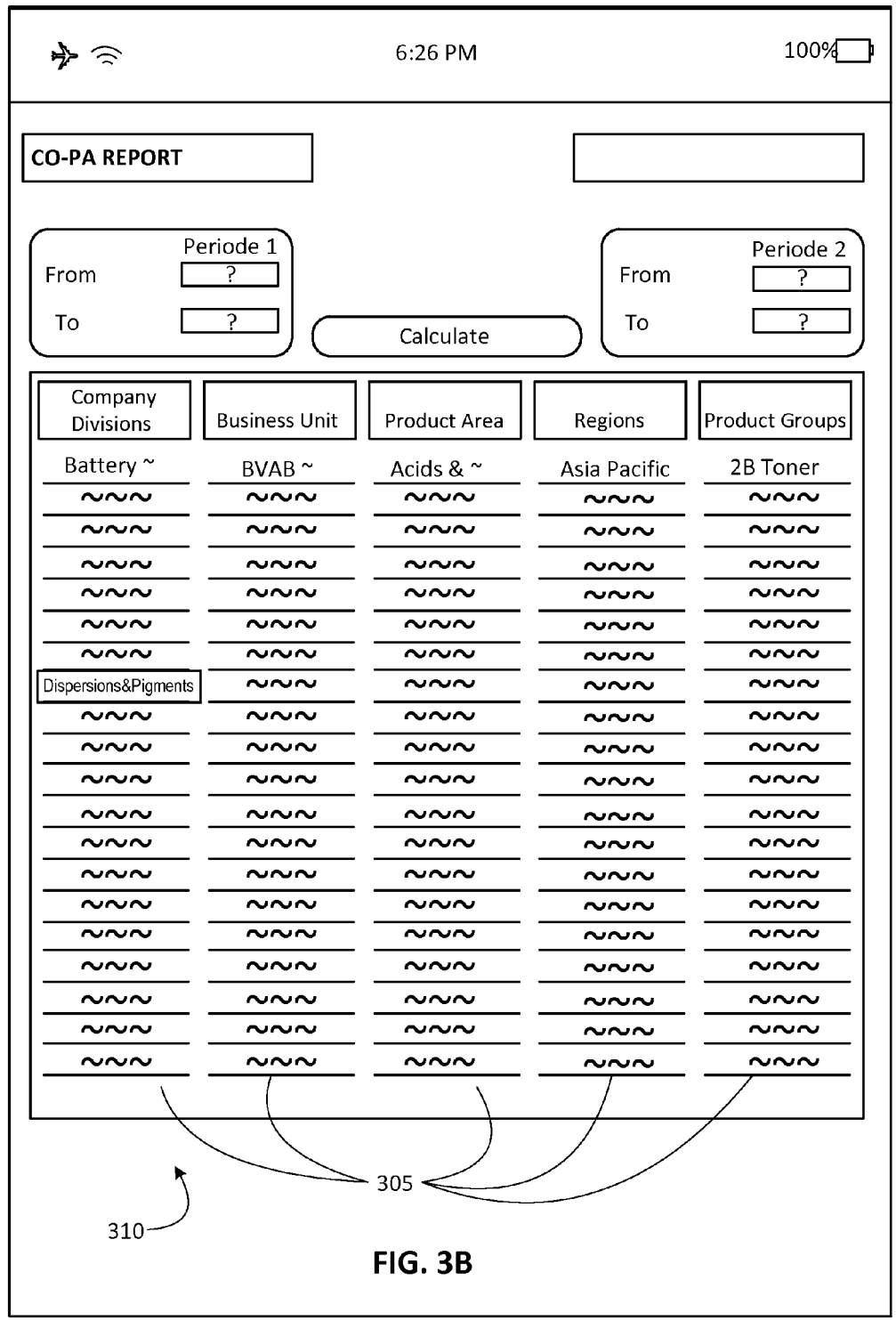
FIG. 3B is a schematic of an example graphical user interface showing user selections in the graphical user interface of FIG. 3A.

FIG. 3A is a schematic of an example GUI 300 for the client operating on a user computer according to one embodiment of the present invention. The example GUI includes a set of columns 305 with various values in the columns. The example GUI specifically includes columns for Company Division, Business Unit, Product Area, Regions, and Product Groups. It is to be understood that the columns and values shown in FIG. 3A are exemplary and various users will configure GUIs for the client differently. A selection of a value in a column initiates the execution of method 200 described above in detail and shown in the high-level flow diagram of FIG. 2. For example, FIG. 3B is a schematic of an example GUI 310 showing that the client via the GUI has received a user selection the value "Dispersions & Pigments" in the Company Division column. Selections may be made on the GUI via a cursor selection by mouse control, via a touch on a touch interface of the user computer, or the like. With the selection of the value "Dispersions & Pigments" in the Company Division method 200 is executed by computer system 100 and the search result for the selection of the value "Dispersions & Pigments" is an update of the columns for the Business Unit, the Product Area, and the Regions. Method 200 as shown in the exemplary GUIs of FIGS. 3A and 3B is sometime referred to as a "drill down" as additional information for a selected value is displayed on the GUI based on the selection of the value. The client may be configured to provide additional drill downs based on alternative selection of values in the GUI.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method operable on a computer system for hosted-content retrieval comprising:
   receiving at a client, which is operating on a user computer, a user request for hosted content stored in a database;
   generating at the client a URL request having URL parameters according to a representational state transfer (REST) protocol;
   transmitting the URL request from the client to a gateway, which is operating on a server computer;
   extracting via the gateway the URL parameters from the URL request according to the REST protocol,
   generating via the gateway a database query for hosted content identified by the URL parameters;
   transmitting via the gateway the database query to the database;
   generating in the database via an in-memory database engine a search report for the database query;
   transmitting the search report from the database to the gateway;
   encoding via the gateway the search report in an XML representation according to the REST protocol;
   transmitting the search report in the XML representation from the gateway to the client; and
   decoding via the client the search report in the XML representation via the REST protocol for use by the client.

2. The computer-implemented method of claim 1, further comprising presenting a graphical representation of the search report on the user computer subsequent to the decoding step.

3. The computer-implemented method of claim 1, wherein the search report generated by the in-memory database engine is an SQL report.

4. The computer-implemented method of claim 1, wherein the search report is generated based on an analytical view of the database and the hosed data stored in the database.

5. The computer-implemented method of claim 1, wherein the database request is an SQL request.

6. The computer-implemented method of claim 1, wherein the transmitting steps are executed via a network.

7. A non-transitory computer readable medium storing computer code to control a computer system for hosted-content retrieval comprising:
   a first storage component executable by a user computer including code for:
      receiving at a client, which is operating on a user computer, a user request for hosted content stored in a database;
      generating at the client a URL request having URL parameters according to a representational state transfer (REST) protocol; and
      transmitting the URL request from the client to a gateway, which operating on a server computer;
   a second storage component executable by a server computer including code for:
      extracting via the gateway the URL parameters from the URL request according to the REST protocol;
      generating via the gateway a database query for hosted content identified by the URL parameters; and
      transmitting via the gateway the database query to the database; and
   a third storage component executable by an in-memory database engine including code for:
      generating in the database via an in-memory database engine a search report for the database query; and
      transmitting the search report from the database to the gateway, wherein the second storage component includes code for:

encoding via the gateway the search report in an XML representation according to the REST protocol; and transmitting the search report in the XML representation from the gateway to the client; and wherein the first storage component further including code for decoding via the client the search report in the XML representation via the REST protocol for use by the client.

8. The non-transitory computer readable medium of claim 7, wherein the first storage component further includes code for presenting a graphical representation of the search report on the user computer subsequent to the decoding step.

9. The non-transitory computer readable medium of claim 7, wherein the search report generated by the in-memory database engine is an SQL report.

10. The non-transitory computer readable medium of claim 7, wherein the search report is generated based on an analytical view of the database and the hosed data stored in the database.

11. The non-transitory computer readable medium of claim 7, wherein the database request is an SQL request.

12. A computer system for hosted-content retrieval comprising:

a user computer operating a client configured to:
 receive a user request for hosted content stored in a database;
 generate URL request having URL parameters according to a representational state transfer (REST) protocol;
 transmit the URL request from the client to a gateway operating on a server computer;

a server computer operating the gateway configured to:
 extract the URL parameters from the URL request according to the REST protocol,
 generate a database query for hosted content identified by the URL parameters;
 transmit the database query to a database;

a database operating an in-memory database engine configured to
 generate a search report for the database query; and
 transmit the search report from the database to the gateway, wherein the server computer operating the gateway is further configured to encode the search report in an XML representation according to the REST protocol, and transmit the search report in the XML representation from the gateway to the client, and wherein the user computer operating the client is further configured to decode the search report in the XML representation via the REST protocol for use by the client.

13. The computer system of claim 12, wherein the computer system operating the client is configured to present a graphical representation of the search report on the user computer subsequent to the decoding step.

14. The computer system of claim 12, wherein the search report generated by the in-memory database engine is an SQL report.

15. The computer system of claim 12, wherein the search report is generated based on an analytical view of the database and the hosed data stored in the database.

16. The computer system of claim 12, wherein the database request is an SQL request.

17. The computer system of claim 12, wherein a computer network is configured to provide communication links between the user computer, the server computer, and the database.

* * * * *